(12) United States Patent
Watanabe et al.

(10) Patent No.: US 6,581,904 B2
(45) Date of Patent: Jun. 24, 2003

(54) SOLENOID VALVE

(75) Inventors: Kazuhisa Watanabe, Kariya (JP); Yasuo Kato, Aichi-ken (JP); Masato Yoshioka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/779,441

(22) Filed: Feb. 9, 2001

(65) Prior Publication Data

US 2001/0017360 A1 Aug. 30, 2001

(30) Foreign Application Priority Data

Feb. 16, 2000 (JP) ........................................ 2000-037611
Mar. 14, 2000 (JP) ........................................ 2000-070769

(51) Int. Cl.$^7$ ............................................. F16K 31/02
(52) U.S. Cl. .......................... 251/129.17; 251/129.01; 251/284
(58) Field of Search .................. 251/129.17, 129.15, 251/129.01, 318, 284

(56) References Cited

U.S. PATENT DOCUMENTS

| 3,416,555 A | * | 12/1968 | Chapou | .................... 137/269.5 |
| 3,656,503 A | * | 4/1972 | Ward | .................... 137/119.08 |
| 3,913,605 A | * | 10/1975 | Ward | .......................... 137/467 |
| 4,062,378 A | * | 12/1977 | Bender | .................... 137/269.5 |
| 4,307,746 A | * | 12/1981 | Rifat | .......................... 137/291 |
| 4,860,990 A | * | 8/1989 | Fukuzawa et al. | ............. 138/42 |
| 5,379,985 A | * | 1/1995 | Waij et al. | .................... 251/331 |
| 5,487,407 A | * | 1/1996 | Eaker | .......................... 137/522 |
| 5,919,501 A | * | 7/1999 | Rozzano | .................... 206/459.5 |

FOREIGN PATENT DOCUMENTS

| JP | 7-233882 | 9/1995 |
| JP | 8-270818 | 10/1996 |
| JP | 8-312827 | 11/1996 |

* cited by examiner

Primary Examiner—Kevin Shaver
Assistant Examiner—D. Austin Bonderer
(74) Attorney, Agent, or Firm—Nixon & Vanderhye P.C.

(57) ABSTRACT

A solenoid valve includes an electromagnetic drive unit for generating a magnetomotive force when being fed with electric power. There are a controlled-fluid passage and an accommodation chamber containing the electromagnetic drive unit. A partition wall defines a part of the controlled-fluid passage. A valve opening extends through the partition wall. A shaft extending through the valve opening is driven by the electromagnetic drive unit. A valve member fixed to the shaft moves into and out of contact with the partition wall to block and unblock the valve opening in accordance with movement of the shaft. A thin-film sealing member made of rubber-based resilient material operates for airtightly separating the controlled-fluid passage and the accommodation chamber from each other. A communication passage connects the accommodation chamber and an exterior. An orifice provides a smaller effective cross-sectional area of the communication passage.

11 Claims, 12 Drawing Sheets

SOLENOID VALVE

BACKGROUND OF THE INVENTION

1. Field of the Invention

This invention generally relates to a solenoid valve or an electrically-powered valve for controlling a flow of fluid such as air. This invention particularly relates to a solenoid valve which can be used in an evaporative control system to selectively block and unblock a charcoal-canister pipe opening into the atmosphere.

2. Description of the Related Art

Japanese patent application publication number 7-233882 (application number 6-24075) discloses a solenoid valve for selectively blocking and unblocking communication between a first passage and a second passage. The solenoid valve in Japanese application 7-233882 includes a fixed iron core, a first movable member, and a second movable member. The fixed iron core is magnetized when a coil is energized. The second movable member is formed of a permanent magnet. The magnetic poles of the permanent magnet are arranged so that the permanent magnet repels the fixed iron core when the coil is energized. As the second movable member moves, the first movable member comes into contact with a valve seat defining a portion of the second passage. When the first movable member is in contact with the valve seat, communication between the first passage and the second passage is blocked. An operation chamber extends between the first movable member and the second movable member. The first movable member includes a valve member and an annular diaphragm. The annular diaphragm extends radially outward from the valve member. Thus, the inner circumferential edge of the diaphragm is connected with the valve member. The outer circumferential edge of the diaphragm is connected with a coil hold member. The valve member is movably supported by the diaphragm. The valve member has a first through hole for providing communication between the operation chamber and the second passage. The diaphragm has a second through hole for providing communication between the operation chamber and the first passage. When the valve member is separated from the valve seat, the operation chamber and the second passage communicate with each other via the first through hole. When the valve member is in contact with the valve seat, the first through hole is closed by the second movable member so that the operation chamber and the second passage are disconnected from each other. On the other hand, the operation chamber and the first passage remain in communication with each other via the second through hole regardless of whether the valve member separates from or contacts with the valve seat.

Japanese patent application publication number 8-312827 (application number 7-115918) discloses a solenoid valve including a coil, a moving core, and a yoke. The coil is supported by a coil hold member. The moving core is moved as the coil is energized and de-energized. The yoke has a valve portion formed with a communication hole and a valve seat around the communication hole. A valve rubber is mounted on the moving core. When the coil is de-energized, the moving core is positioned by a return spring so that the valve rubber is separate from the valve seat. Thus, in this case, the communication hole is unblocked. When the coil is energized, the moving core is moved toward the valve portion of the yoke and the valve rubber comes into contact with the valve seat. Thus, in this case, the communication hole is blocked. The moving core has a cylindrical portion extending into a central bore of the coil hold member.

Japanese patent application publication number 8-270818 (application number 7-69817) discloses a solenoid valve similar in structure to the solenoid valve of Japanese application 8-312827.

SUMMARY OF THE INVENTION

It is an object of this invention to provide a solenoid valve which generates only low-level noise or reduced-level noise when a valve member meets a valve seat.

A first aspect of this invention provides a solenoid valve comprising (a) an electromagnetic drive unit for generating a magnetomotive force when being fed with electric power; (b) a member having a controlled-fluid passage and an accommodation chamber containing the electromagnetic drive unit; (c) a partition wall defining a part of the controlled-fluid passage; (d) a valve opening extending through the partition wall; (e) a shaft extending through the valve opening and being driven by the electromagnetic drive unit; (f) a valve member fixed to the shaft and moving into and out of contact with the partition wall to block and unblock the valve opening in accordance with movement of the shaft; (g) a thin-film sealing member made of rubber-based resilient material for airtightly separating the controlled-fluid passage and the accommodation chamber from each other; (h) a communication passage connecting the accommodation chamber and an exterior; and (i) an orifice providing a smaller effective cross-sectional area of the communication passage.

A second aspect of this invention provides a solenoid valve comprising (a) an electromagnetic drive unit for generating a magnetomotive force when being fed with electric power; (b) a member having a controlled-fluid passage and an accommodation chamber containing the electromagnetic drive unit; (c) a partition wall defining a part of the controlled-fluid passage; (d) a valve opening extending through the partition wall; (e) a shaft extending through the valve opening and being driven by the electromagnetic drive unit; (f) a valve member fixed to the shaft and moving into and out of contact with the partition wall to block and unblock the valve opening in accordance with movement of the shaft; and (g) a thin-film sealing member made of rubber-based resilient material for airtightly separating the controlled-fluid passage and the accommodation chamber from each other, the thin-film sealing member having a first portion and a second portion, the second portion extending around the first portion, the first portion being less resiliently deformable than the second portion.

A third aspect of this invention is based on the second aspect thereof, and provides a solenoid valve wherein the first portion is harder than the second portion.

A fourth aspect of this invention is based on the second aspect thereof, and provides a solenoid valve wherein the first portion is thicker than the second portion.

A fifth aspect of this invention is based on the fourth aspect thereof, and provides a solenoid valve wherein the first portion extends over a central area of the thin-film sealing member, and the first portion includes an engagement portion in contact with the shaft and a peripheral portion near the engagement portion.

A sixth aspect of this invention is based on the first aspect thereof, and provides a solenoid valve wherein the partition wall forms a valve seat with which the valve member is moved into and out of contact.

A seventh aspect of this invention is based on the first aspect thereof, and provides a solenoid valve wherein the partition wall has a projection forming a shaft support for locating the shaft radially while allowing axial movement of the shaft.

An eighth aspect of this invention is based on the seventh aspect thereof, and provides a solenoid valve wherein the projection of the partition wall forms a stopper engageable with a projection on the shaft.

A ninth aspect of this invention is based on the seventh aspect thereof, and provides a solenoid valve wherein the projection on the shaft has a cross section of a shape corresponding to an inner shape of the shaft support.

A tenth aspect of this invention provides a solenoid valve comprising a housing defining a fluid passage; a valve seat defining a part of the fluid passage; a valve member movable into and out of contact with the valve seat to block and unblock the fluid passage; a shaft; a fixing member for fixing the valve member to the shaft; a movable iron core holding the shaft and forming a first part of a magnetic circuit; a fixed iron core facing the movable iron core and forming a second part of the magnetic circuit; and a coil extending around the movable iron core and the fixed iron core and generating a magnetic force to move the movable iron core toward the fixed iron core when being fed with electric power; wherein a portion of the fixing member is spaced from a corresponding portion of the valve member by a gap for allowing deformation of the valve member.

An eleventh aspect of this invention is based on the tenth aspect thereof, and provides a solenoid valve wherein the fixing member has a first portion and a second portion, the first portion extending around the second portion and being thinner than the second portion.

A twelfth aspect of this invention is based on the tenth aspect thereof, and provides a solenoid valve wherein the gap is provided by a step on at least one of the fixing member and the valve member.

DETAILED DESCRIPTION OF THE INVENTION

A prior-art solenoid valve will be explained below for a better understanding of this invention.

Figure 1:
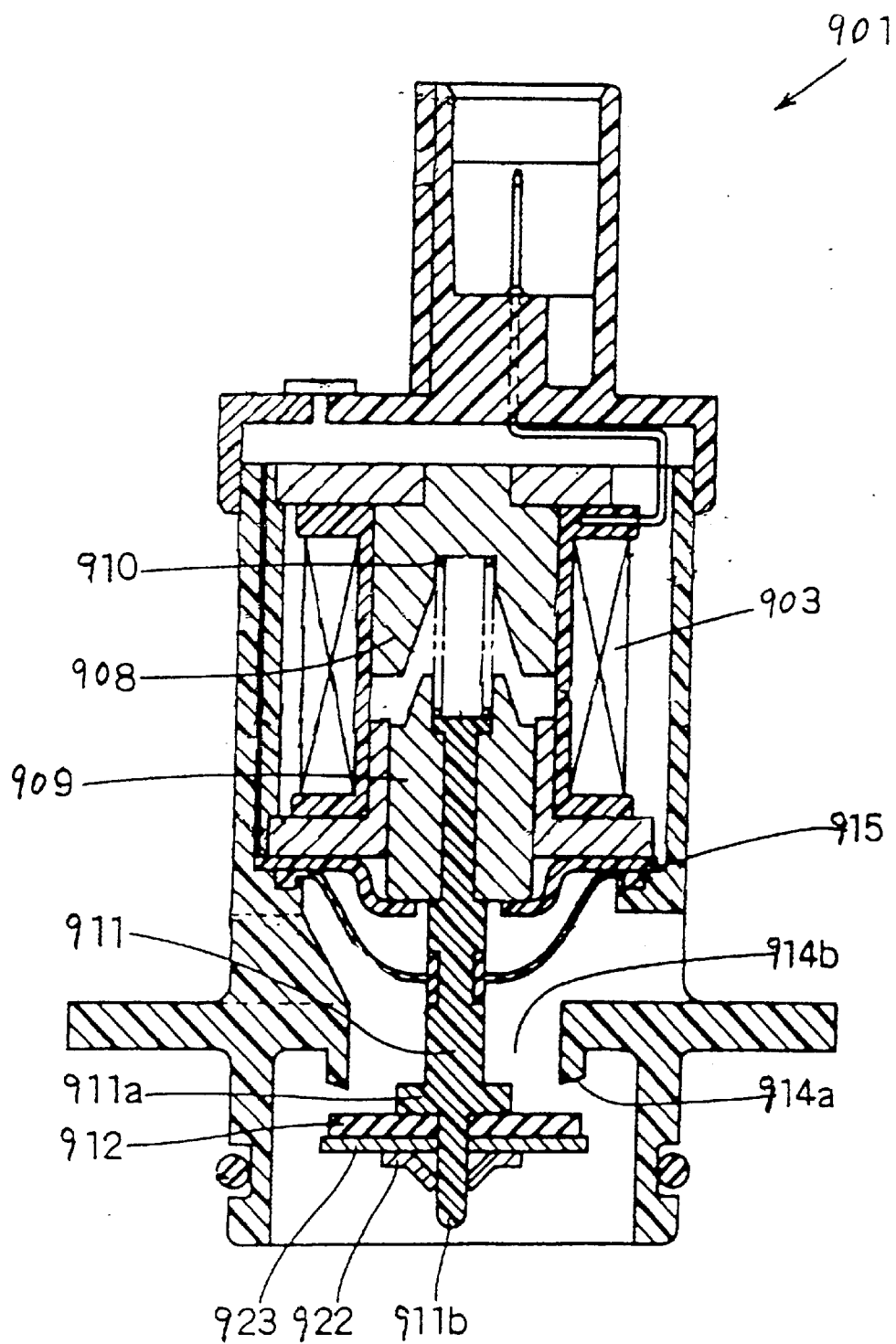
FIG. 1 is a sectional view of a prior-art solenoid valve.

With reference to FIG. 1, a prior-art solenoid valve 901 includes a coil 903, a fixed iron core 908, and a movable iron core 909. A valve member 912 is mounted on a shaft 911 fixed to the movable iron core 909. Walls defining a portion of a passage 914b have a valve seat 914a. When the coil 903 is energized, the movable iron core 909 and the shaft 911 are moved toward the fixed iron core 908 so that the valve member 912 comes into contact with the valve seat 914a. In this case, the passage 914b is blocked. When the coil 903 is de-energized, a return spring 910 moves the movable iron core 909 and the shaft 911 away from the fixed iron core 908 so that the valve member 912 separates from the valve seat 914a. In this case, the passage 914b is unblocked. The movable iron core 909 continues to be moved away from the fixed iron core 908 until meeting a stopper 915.

In the prior-art solenoid valve 901, the movable iron core 909 has a cylindrical main body. The shaft 911 axially extends from the cylindrical main body of the movable iron core 909. A distal end of the shaft 911 has a flange 911a and an axial projection 911b. The valve member 912 fits around the projection 911b. The valve member 912 contacts the flange 911a. A disk 923 fits around the projection 911b. The disk 923 contacts the valve member 912. The disk 923 is approximately equal in outside diameter to the valve member 912. A snap washer 922 mounted on the projection 911b presses the disk 923 against the valve member 912, thereby thrusting the valve member 912 against the flange 911a. Thus, the valve member 912 is fixed to the shaft 911. The valve member 912 moves together with the shaft 911, that is, moves together with the movable iron core 909.

In the prior-art solenoid valve 901, the disk 923 is made of hard resin. In some cases, noise is generated at a considerable level when the valve member 912 meets the valve seat 914a.

First Embodiment

Figure 2:
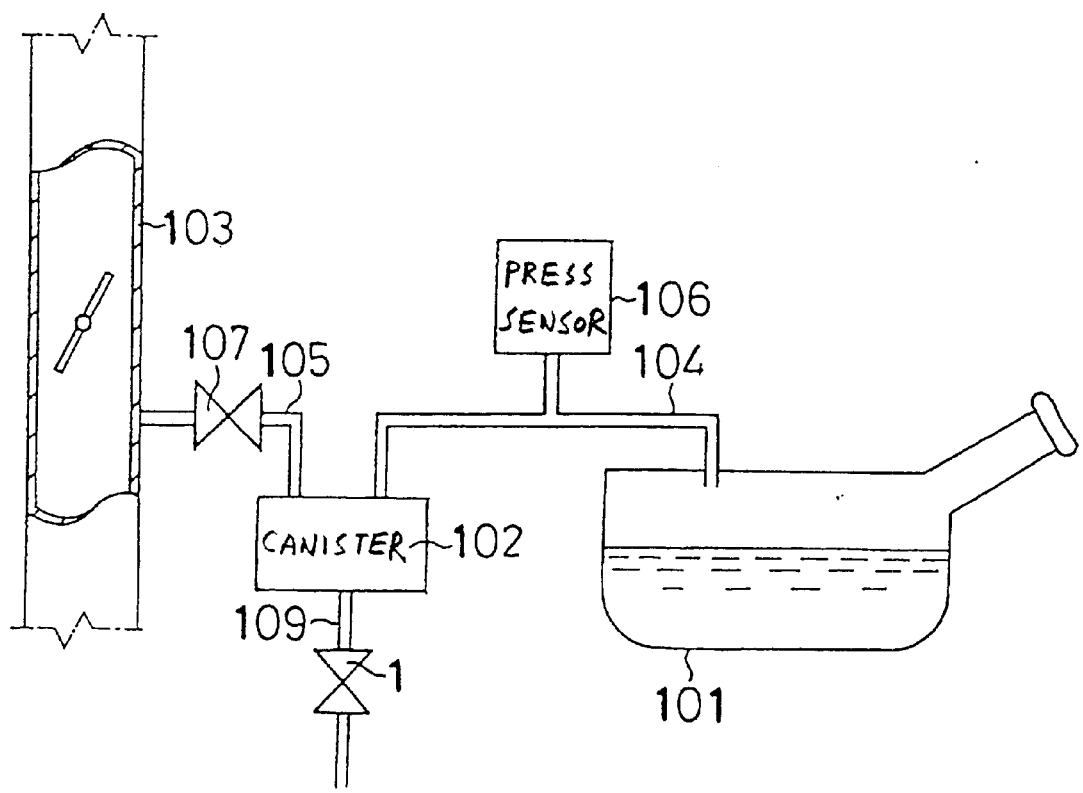
FIG. 2 is a diagram of an evaporative control system for a vehicle which includes a solenoid valve according to a first embodiment of this invention.

With reference FIG. 2, an evaporative control system for a vehicle is associated with a fuel tank 101. The evaporative control system includes a canister 102 filled with adsorbent such as activated charcoal. A pipe 104 connects the fuel tank 101 and the canister 102. A pipe 105 connects the canister 102 with a portion of an engine air passage 103 downstream of a throttle valve.

Fuel vapor is guided from the fuel tank 101 to the canister 102 via the pipe 104 before being adsorbed by the canister 102. Fuel vapor released from the canister 102 is drawn into the engine air passage 103 via the pipe 105. Thus, purging is implemented with respect to fuel vapor. The evaporative control system prevents fuel vapor from being emitted into the atmosphere.

A pressure sensor 106 is connected with the pipe 104. A purge valve 107 is interposed in the pipe 105. A pipe 109 extending from the canister 102 opens into the atmosphere.

The evaporative control system includes a solenoid valve 1 according to a first embodiment of this invention. The solenoid valve 1 is interposed in the pipe 109. The solenoid valve 1 selectively blocks and unblocks the pipe 109. When the pipe 109 is unblocked, an atmosphere (air) is permitted to enter the canister 102. When the pipe 109 is blocked, an atmosphere (air) is inhibited from entering the canister 102. In addition, the escape of fuel vapor from the canister 102 into the atmosphere is avoided.

While a vehicular engine is operating and hence a vacuum is developed in a region of the engine air passage 103 downstream of the throttle valve, the evaporative control system implements a check on the leak of fuel vapor as follows. The pipe 109 is blocked by the solenoid valve 1. Then, the purge valve 107 is opened so that the pipes 104 and 105 and the canister 102 are subjected to a vacuum. Subsequently, the purge valve 107 is closed. At a predetermined time after the moment when the purge valve 107 is closed, a measurement is given of whether or not a pressure rise is detected by the pressure sensor 106. A decision is made as to the leak of fuel vapor on the basis of the result of the measurement.

The solenoid valve 1 will be described below in more detail. With reference to FIGS. 3–11, the solenoid valve 1 is of a normally open type. The solenoid valve 1 includes a housing 2 in which a tubular or cylindrical member 3 is fixedly disposed. An electromagnetic drive unit including a coil 4 is located in the tubular member 3. As will be made clear later, a shaft 7 is axially moved by the electromagnetic drive unit. A disk-shaped valve member 8 is coaxially mounted on the shaft 7. The valve member 8 moves together with the shaft 7. A diaphragm 9 is provided between the tubular member 3 and the shaft 7. A passage 10 for controlled fluid (controlled air) extends in the housing 2. The diaphragm 9 airtightly or fluidtightly separates a first control chamber 11 and a second control chamber 12 from each other. The second control chamber 12 extends in the tubular member 3.

Figure 3:
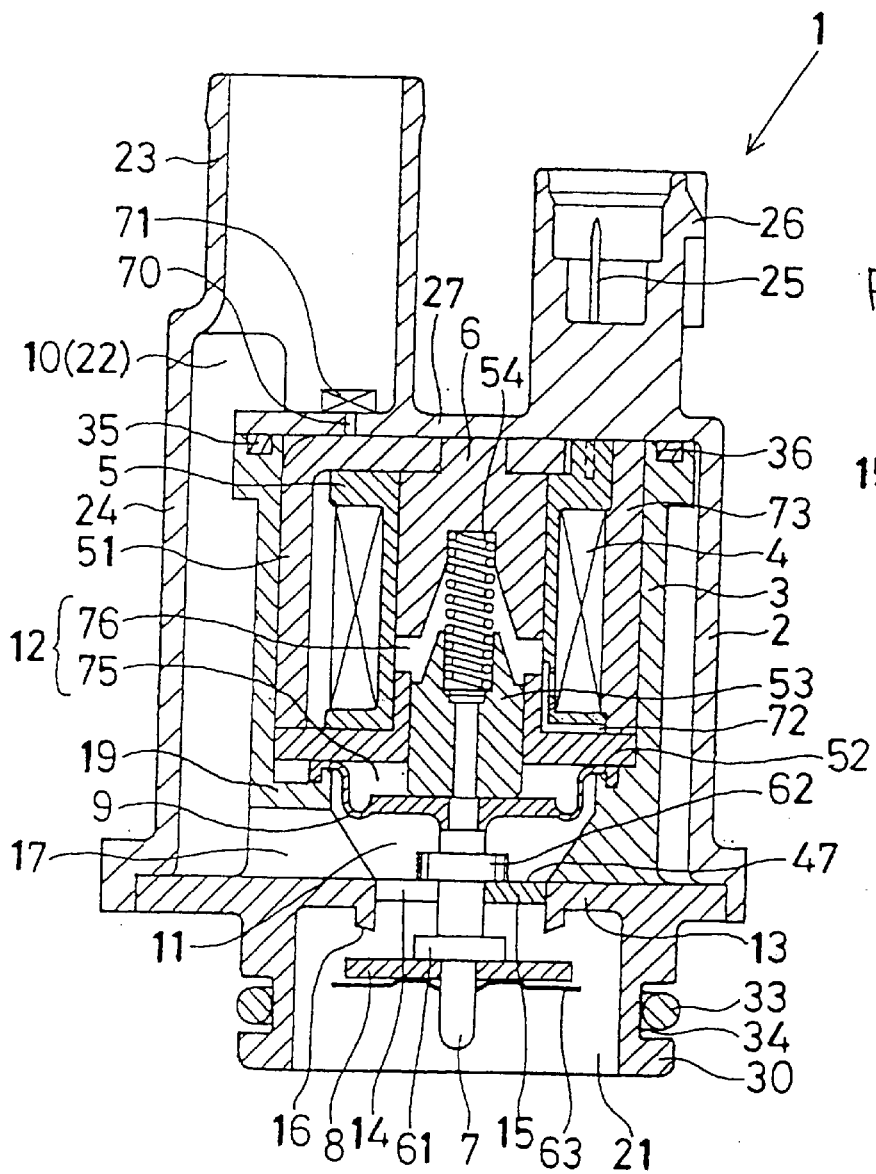
FIG. 3 is a sectional view of the solenoid valve in FIG. 2.

The housing 2 is made of electrically-insulating resin. The housing 2 has a cylindrical pipe 23 and a partially cylindrical pipe 24. The interiors of the pipes 23 and 24 form a passage 22 for controlled fluid (controlled air). The controlled-fluid passage 22 constitutes a portion of the controlled-fluid passage 10. In FIG. 3, the controlled-fluid passage 22 opens into the atmosphere at its upper end. The housing 2 is integrally formed with a connector portion 26. A pair of terminals 25 are inserted into the connector portion 26. The terminals 25 provide electrical connection between the coil 4 and an external power supply. In FIG. 3, a flange 3A on the tubular member 3 fits in a lower end of the housing 2. For example, a heating process is carried out to provide airtight or fluidtight engagement between the flange 3A on the tubular member 3 and the lower end of the housing 2.

The tubular member 3 is made of electrically-insulating resin. The first and second control chambers 11 and 12 extend in an interior of a portion of the tubular member 3 above its flange 3A as viewed in FIG. 3. The first control chamber 11 is located immediately above the flange 3A. The first control chamber 11 communicates with the controlled-fluid passage 22. The electromagnetic drive unit (the coil 4) is located in the second control chamber 12. In FIG. 3, a portion of the tubular member 3 below its flange 3A has a central hole constituting a passage 21 for controlled fluid (controlled air). The passage 21 is referred to as the first controlled-fluid passage. On the other hand, the passage 22 is referred to as the second controlled-fluid passage. Basically, the first controlled-fluid passage 21, the second controlled-fluid passage 22, and the first control chamber 11 compose the controlled-fluid passage 10. The tubular member 3 is integrally formed with partition walls 13 projecting radially inward which separate the first control chamber 11 and the second controlled-fluid passage 21 from each other.

Figure 9:
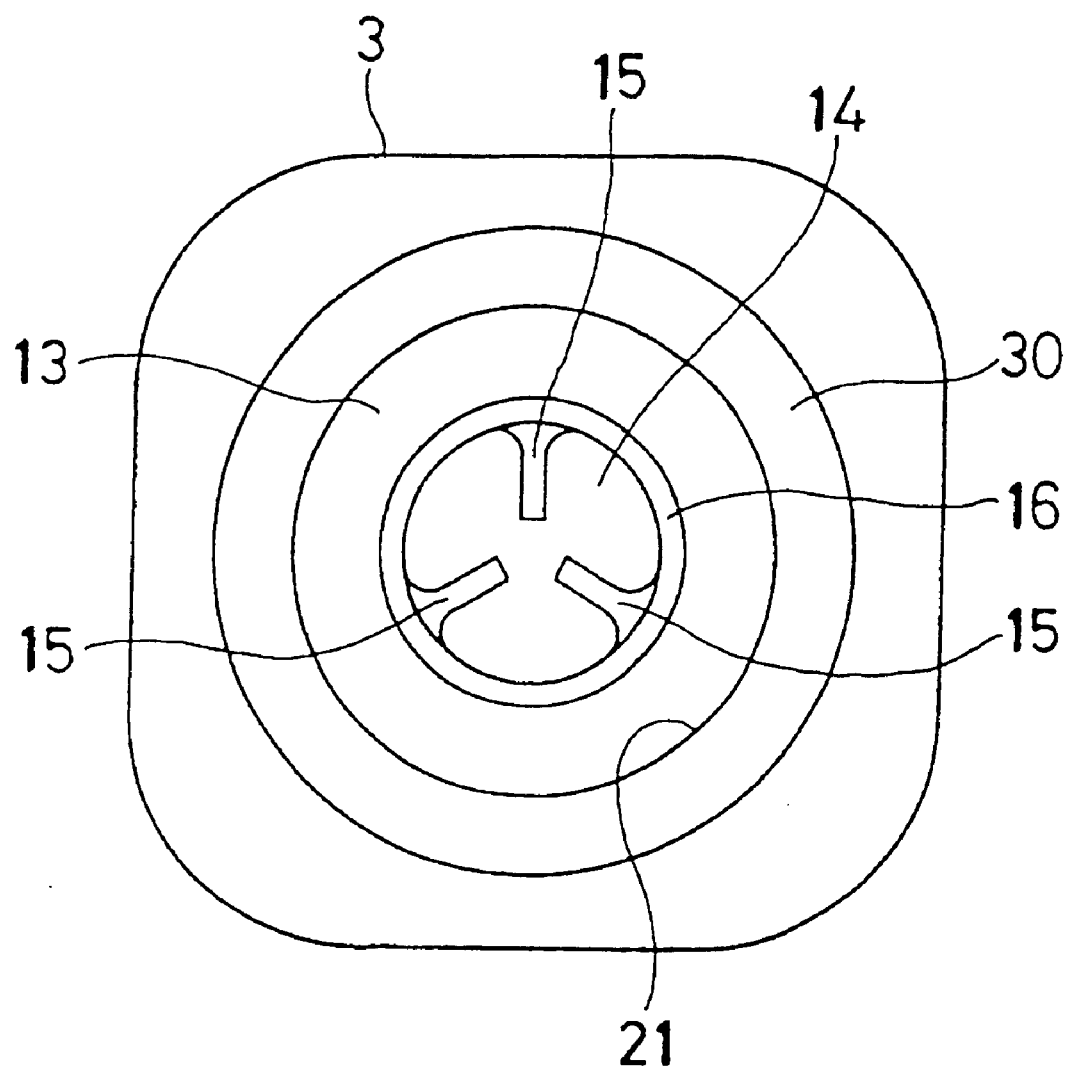
FIG. 9 is a plan view of a tubular member and the valve opening in FIG. 3.

The inner edges of the partition walls 13 define a valve opening 14 of a predetermined shape (see FIG. 9). The valve opening 14 has sectoral portions. The valve opening 14 forms a part of the controlled-fluid passage 10. When the solenoid valve 1 is in its open state, the first control chamber 11 and the first controlled-fluid passage 21 communicate with each other via the valve opening 14. When the solenoid valve 1 is in its closed state, the valve opening 14 is closed so that communication between the first control chamber 11 and the first controlled-fluid passage 21 is blocked. The partition walls 13 have radially-inward projections constituting shaft supports 15. As best shown in FIG. 9, the shaft supports 15 are spaced at equal angular intervals. The number of the shaft supports 15 is equal to, for example, three. The sectoral portions of the valve opening 14 are located between the shaft supports 15.

Figure 10:
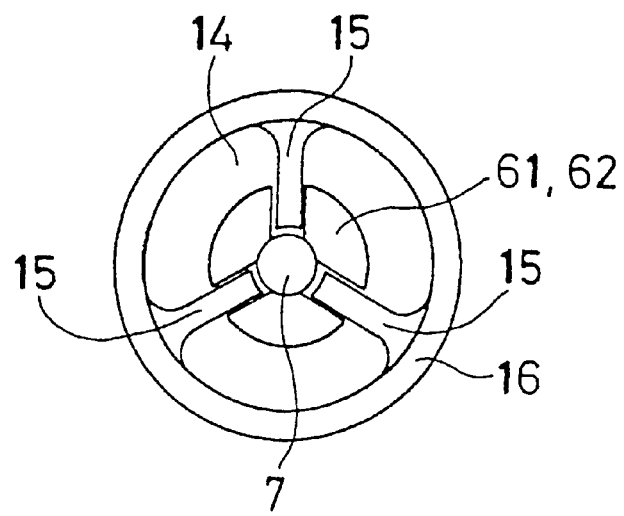
FIG. 10 is a plan view of the valve opening, the shaft supports, the shaft, an end projection on the shaft, and a valve seat in FIG. 3.
Figure 11:
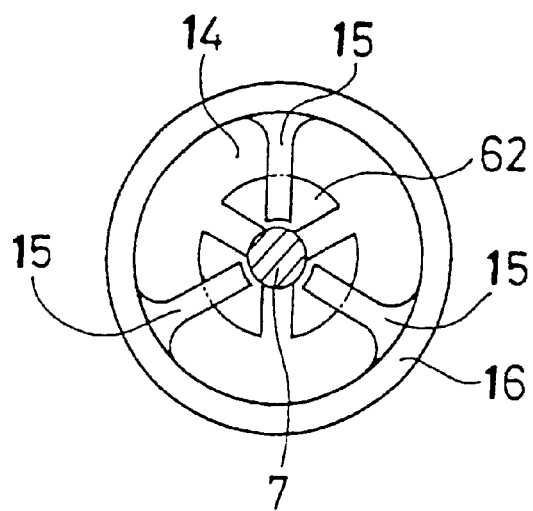
FIG. 11 is a sectional view of the valve opening, the shaft supports, the shaft, a central projection on the shaft, and the valve seat in FIG. 3.

As shown in FIGS. 9, 10, and 11, the valve opening 14 has sectoral portions defined by the inner circumferential surfaces of the partition walls 13 and the side surfaces of the shaft supports 15. The valve opening 14 has an inside diameter of, for example, 4.2 mm. The shaft supports 15 extend radially inward from the inner circumferential surfaces of the partition walls 13. The shaft supports 15 have a thickness of, for example, 1.5 mm. The shaft supports 15 have a width of, for example, 1.5 mm. The shaft supports 15 form stoppers 47 for the shaft 7. A projection 62 on the shaft 7 can meet the stoppers 47 (the shaft supports 15).

In FIG. 3, the inner edges of the partition walls 13 have an axial downward projection forming a valve seat 16 of a circular ring shape. The height (the axial dimension) of the valve seat 16 from the lower base surface of the partition walls 13 is equal to, for example, 2 mm. The walls of the valve seat 16 have a thickness of, for example, 1.5 mm. The distal end of the valve seat 16 is tapered. The valve seat 16 may be covered with a cushion rubber or a rubber-based resilient member. The valve seat 16 extends around the valve opening 14. The tubular member 3 has a radially-extending hole 17 of an approximately circular cross-section which forms a part of the first control chamber 11, and which is located above the partition walls 13. The tubular member 3 has engagement walls 19 which project radially inward, and which are of a circular ring shape. The engagement walls 19 support the outer circumferential edge of the diaphragm 9. A portion of the engagement walls 19 extends immediately above the hole 17.

In FIG. 3, a lower end of the tubular member 3 forms a pipe 30 of a circular cross-section. The first controlled-fluid passage 21 extends in the pipe 30. The pipe 30 is connected with the pipe 109 (see FIG. 2) leading from the canister 102 (see FIG. 2). A sealing member 33 such as an O-ring fits into an annular groove 34 in the outer circumferential surfaces of the pipe 30. The sealing member 33 provides airtight or fluidtight connection between the pipes 30 and 109. The upper end of the tubular member 3 abuts against the walls 27 of a closed upper end of the housing 2. A sealing member 35 such as a packing fits in a ring groove 36 in the upper end surface of the tubular member 3. The sealing member 35 provides airtight or fluidtight contact between the upper end of the tubular member 3 and the closed upper end of the housing 2.

The second control chamber 12 extends in the tubular member 3. The electromagnetic drive unit (the coil 4) is disposed in the second control chamber 12. The electromagnetic drive unit includes a cylindrical bobbin 5, the stator core (a fixed iron core) 6, a yoke 51, a magnetic plate 52, a moving core 53, and a return spring 54. The coil 4 is wound on the bobbin 5. The stator core 6 extends inward of the bobbin 5. The stator core 6 is made of magnetic material. The yoke 51 is made of magnetic material. The magnetic plate is made of magnetic material. The moving core 53 is made of magnetic material. The stator core 6, the yoke 51, the magnetic plate 52, and the moving core 53 compose a magnetic circuit. The moving core 53 is mounted on the shaft 7. The moving core 53 moves together with the shaft 7. The return spring 54 urges the moving core 53 relative to the stator core 6 toward a position corresponding to the open state of the solenoid valve 1.

The coil 4 has turns provided on the outer circumferential surfaces of the bobbin 5. Ends of the coil 4 are electrically connected to the power supply via the terminals 25. The bobbin 5 is made of electrically-insulating material. The stator core 6 has a projection which is fitted into a hole in the yoke 51 by a pressing process. Thus, the stator core 6 and the yoke 51 are fixed to each other. The yoke 51 is of an approximately L-shaped section. In FIG. 3, the yoke 51 is held between the upper end walls of the housing 2 and the engagement walls 19 of the tubular member 3. The yoke 51 is fixed in the tubular member 3.

The magnetic plate 52 has a cylindrical portion extending axially with respect to the tubular member 3, and an annular portion (a flange portion) extending radially outward from a lower end of the cylindrical portion. In FIG. 3, the annular portion (the flange portion) of the magnetic plate 52 is supported between the lower end of the yoke 51 and the engagement walls 19 of the tubular member 3. The moving core 53 slidably extends into the bore of the cylindrical portion of the magnetic plate 52. The moving core 53 is movably supported by the magnetic plate 52. The moving core 53 is located by the magnetic plate 52 in the radial direction. In FIG. 3, a lower end of the stator core 6 has a recess. An upper end of the moving core 53 has a projection facing the recess in the stator core 6. When the coil 4 is energized, there occurs a magnetomotive force driving the moving core 53 toward the stator core 6. At this time, the projection of the moving core 53 moves into the recess in the stator core 6. The return spring 54 urges an axially-movable set of the shaft 7, the valve member 8, the diaphragm 9, and the moving core 53 toward a position corresponding to the closed state of the solenoid valve 1. The return spring 54 is provided between the stator core 6 and the moving core 53. An upper portion of the return spring 54 is supported in the recess of the stator core 6. A lower portion of the return spring 54 is supported in a recess of the moving core 53.

Figure 4:
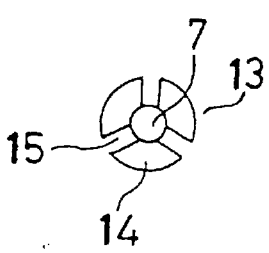
FIG. 4 is a sectional view of a shaft, shaft supports, and a valve opening in FIG. 3.
Figure 5:
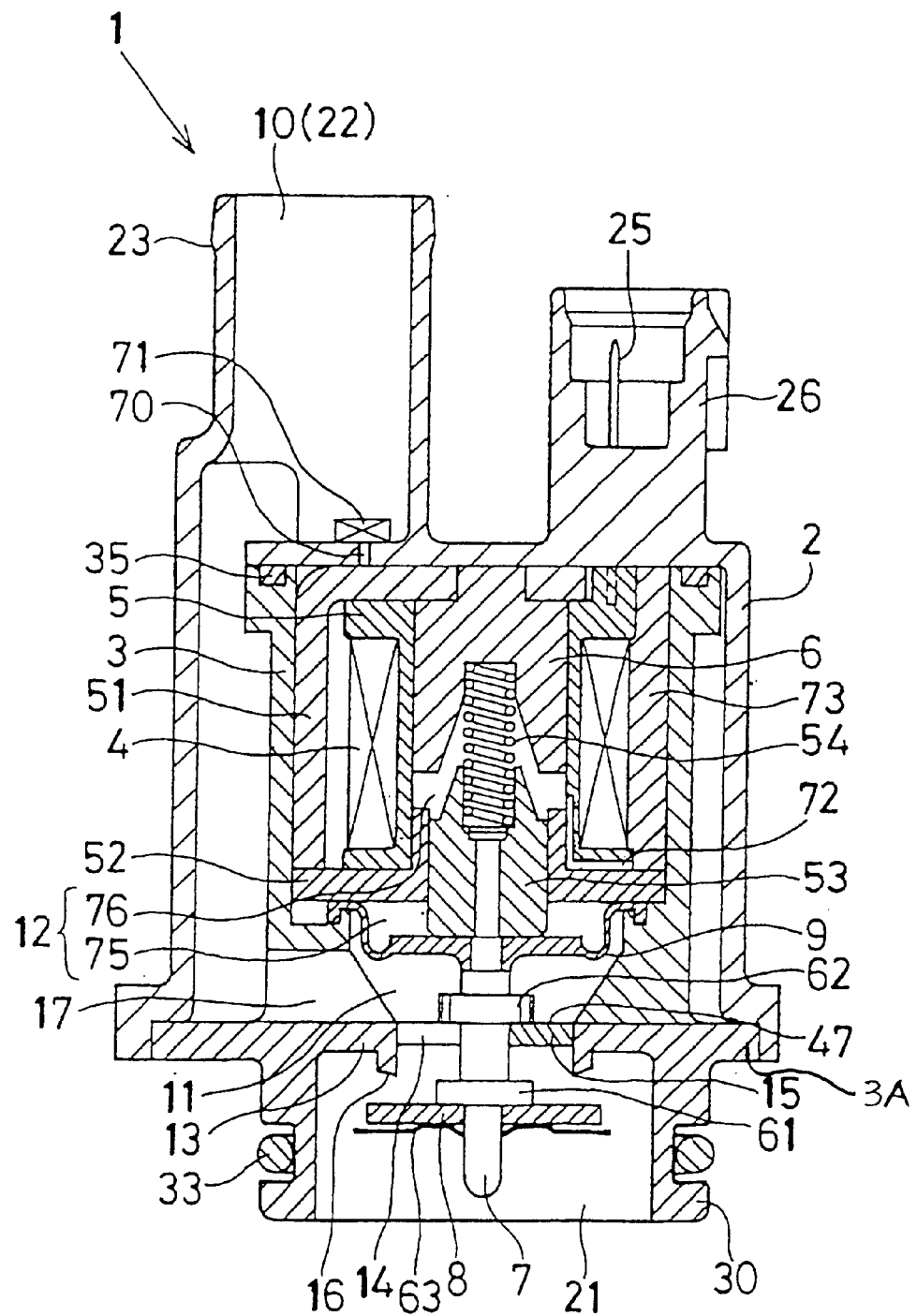
FIG. 5 is a sectional view of the solenoid valve which is in its open state.

The shaft 7 is made of resin. The shaft 7 extends through the valve opening 14. In addition, the shaft 7 extends along the axis of the tubular member 3. The shaft 7 is axially movable. The shaft 7 moves together with the moving core 53. A portion of the shaft 7 in and near the valve opening 14 has an outside diameter of, for example, 4 mm. As best shown in FIG. 4, this portion of the shaft 7 is slidably supported by the end surfaces of the shaft supports 15. Thus, the shaft 7 is located by the shaft supports 15 in the radial direction.

As best shown in FIGS. 3 and 10, the shaft 7 has a radially-outward projection 61 of a shape corresponding to the shapes of the valve opening 14 and the shaft supports 15. The projection 61 on the shaft 7 has sectoral segments similar in shape to the sectoral portions of the valve opening 14. The projection 61 has an outside diameter of, for example, 7 mm. In FIG. 3, the projection 61 extends below the shaft supports 15. The projection 61 is referred to as the end projection. As best shown in FIGS. 3 and 11, the shaft 7 has a radially-outward projection 62. The projection 62 has an outside diameter of, for example, 7 mm. In FIG. 3, the projection 62 extends above the shaft supports 15. The projection 62 is referred to as the central projection. The central projection 62 can meet the stoppers 47 formed by the upper surfaces of the shaft supports 15. The end projection 61 and the central projection 62 are equal in shape. Thus, the central projection 62 has sectoral segments. An upper portion of the shaft 7 is inserted into an axial hole of the moving core 53. The shaft 7 is fixed to the moving core 53 by a thermally deforming process.

The valve member 8 is made of rubber-based resilient material, for example, HNBR resistant to gasoline. Here, HNBR means nitrile-butadiene rubber (NBR) to which hydrogen is added through double bond. HNBR is better than NBR in heat-resisting performances. The valve member 8 is basically of a disk shape coaxial with the shaft 7. The valve member 8 extends in the first controlled-fluid passage 21 within the tubular member 3. In FIG. 3, the valve member 8 is located below the end projection 61 of the shaft 7. The valve member 8 axially moves together with the shaft 7. When the solenoid valve 1 is in its closed state, the valve member 8 contacts the valve seat 16 and hence blocks the valve opening 14. A ring-shaped washer 63 in engagement with the shaft 7 presses the valve member 8 against the end projection 61 of the shaft 7, thereby fixing the valve member 8 to the shaft 7. The washer 63 has an axially upward projection which abuts against the valve member 8. An outer portion of the valve member 8 and an outer portion of the washer 63 are axially spaced from each other by a gap of a predetermined size (a predetermined thickness) which enables the valve member 8 to deform and hence contact a complete circle of the valve seat 16 even if the valve member 8 tilts.

The diaphragm 9 forms a thin-film sealing member. The diaphragm 9 extends around the shaft 7. In FIG. 3, the diaphragm 9 is located above the central projection 62 of the shaft 7. An inner portion of the diaphragm 9 is held between the lower end of the moving core 53 and a step on the shaft 7. Thus, the diaphragm 9 is mounted on the shaft 7. The diaphragm 9 is made of rubber-based resilient material such as NBR (nitrile-butadiene rubber). The diaphragm 9 airtightly or fluidtightly partitions a portion of the controlled-fluid passage 10 into the first control chamber 11 and the second control chamber 12. During the change of the solenoid valve 1 to its closed state, the diaphragm 9 enables the valve member 8 to gently contact the valve seat 16 while adjusting the pressure balance between the first control chamber 11 and the second control chamber 12.

An outer circumferential edge of the diaphragm 9 fits on the engagement walls 19 of the tubular member 3. The outer circumferential edge of the diaphragm 9 is held between the engagement walls 19 of the tubular member 3 and a lower end of the magnetic plate 52. The held portion of the diaphragm 9 presses the magnetic plate 52 against the yoke 51 and the bobbin 5. A central portion of the diaphragm 9 forms a circular connection portion 64 extending around the shaft 7. The connection portion 64 of the diaphragm 9 is attached to the shaft 7. Specifically, the connection portion 64 of the diaphragm 9 is held between the lower end of the moving core 53 and the step on the shaft 7. The diaphragm 9 has an easily deformable portion 65 which extends outward from the connection portion 64. The thickness of the connection portion 64 is greater than that of the easily deformable portion 65. Therefore, the connection portion 64 is harder than the easily deformable portion 65. The shaft 7 is inserted through a central hole of the connection portion 64 by a pressing process. Thus, the shaft 7 and the connection portion 64 of the diaphragm 9 are fixed to each other.

In FIG. 3, the walls 27 of the closed upper end of the housing 2 have a through hole 70 with a width of, for example, 4 mm. The hole 70 allows the flow of air between the second control chamber 12 and the interior of the pipe 23 (the controlled-fluid passage 22). A water repellent filter 71 located in the pipe 23 covers an end of the hole 70. The water repellent filter 71 prevents water or other foreign substances from entering the second control chamber 12. Air can pass through the water repellent filter 71.

Figure 6:
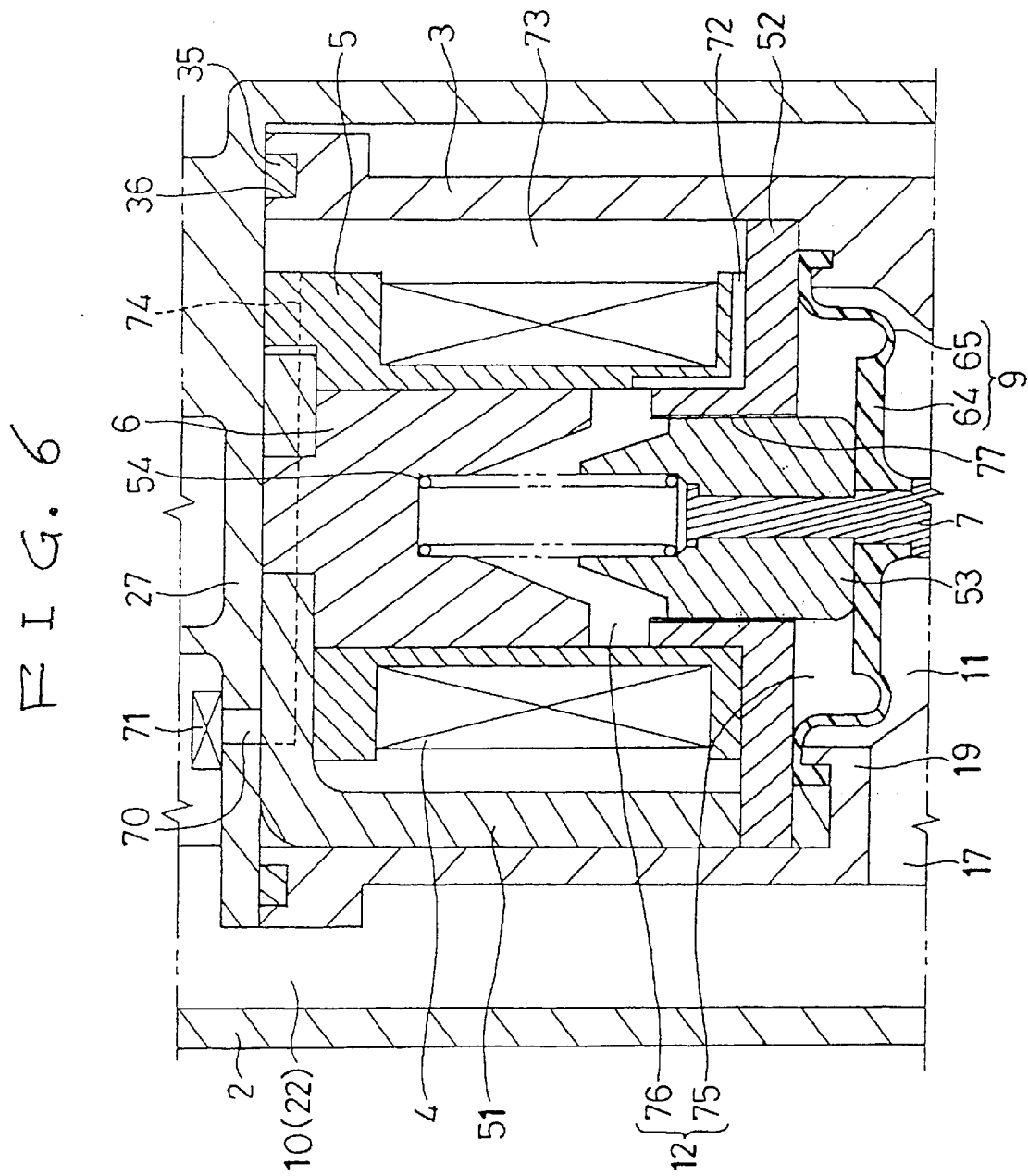
FIG. 6 is a sectional view of a portion of the solenoid valve which is in its open state.
Figure 7:
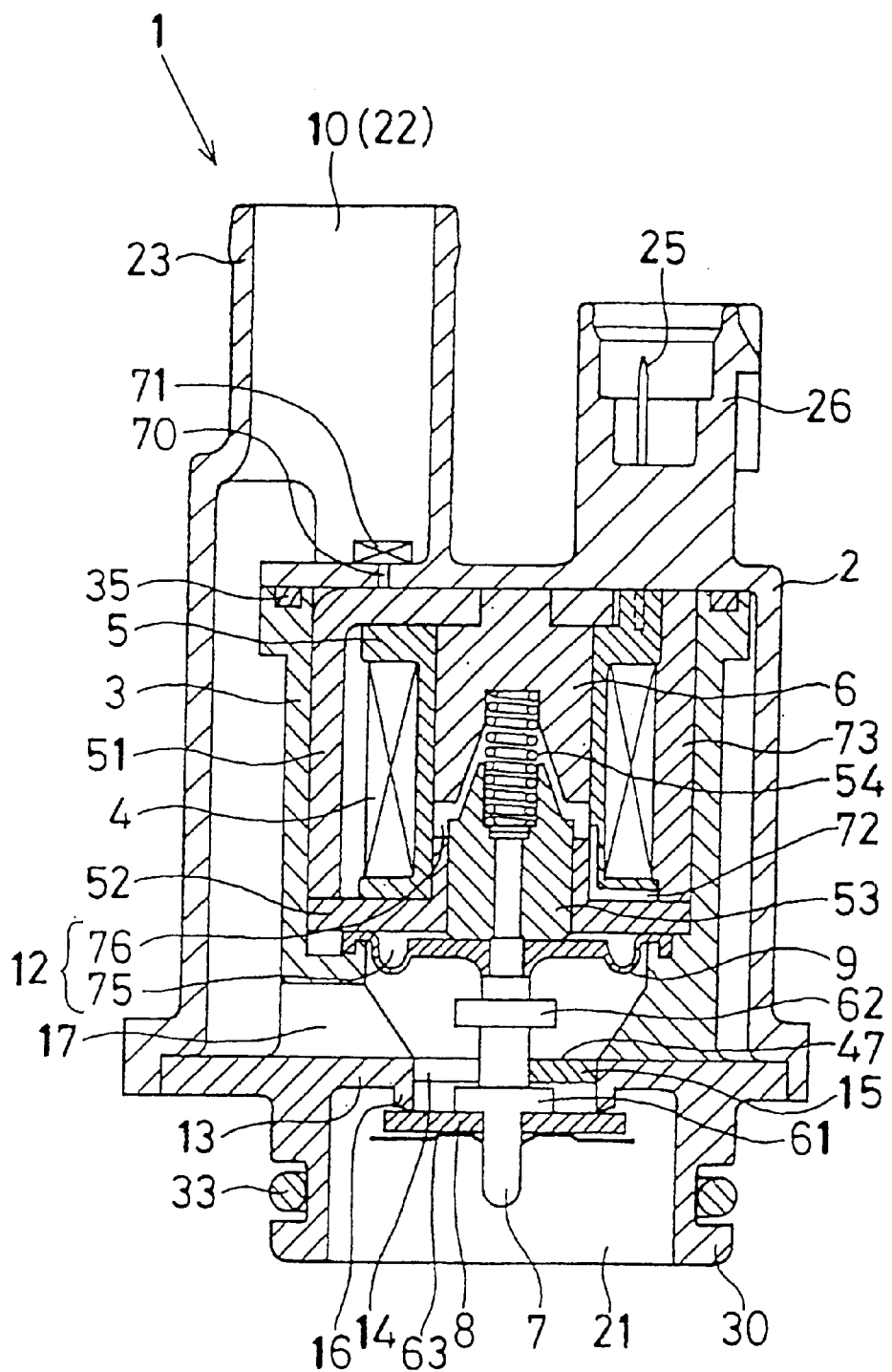
FIG. 7 is a sectional view of the solenoid valve which is in its closed state.

The bobbin 5 is formed with an orifice 72 having a width of, for example, 0.8 mm. The effective cross-sectional area of the orifice 72 is smaller than that of the hole 70. The orifice 72 allows a low-rate flow of air into and from the second control chamber 12. An end of the orifice 72 is exposed in the second control chamber 12. As best shown in FIG. 6, a passage 73 in communication with the orifice 72 is defined between the inner circumferential surfaces of the tubular member 3 and the outer circumferential surfaces of the set of the coil 4 and the bobbin 5. The passage 73 has a width of, for example, 3 mm. The effective cross-sectional area of the passage 73 is greater than that of the orifice 72. The hole 70 and the passage 73 are connected by a passage 74 defined between the stator core 6, the yoke 51, and the upper end walls 27 of the housing 2. The passage 74 has a width of, for example, 3 mm. The effective cross-sectional area of the passage 74 is greater than that of the orifice 72.

Figure 8:
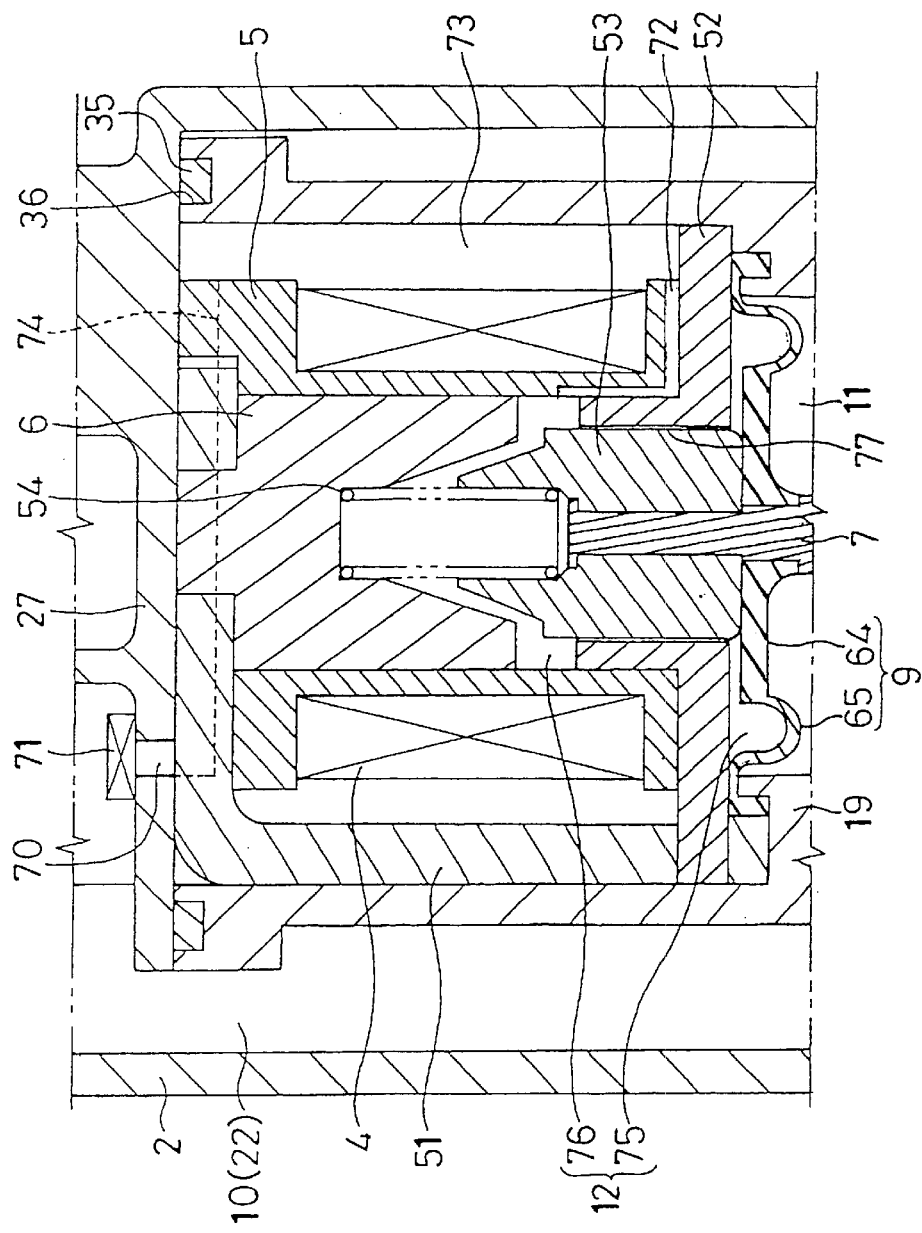
FIG. 8 is a sectional view of a portion of the solenoid valve which is in its closed state.

The second control chamber 12 includes sub-chambers 75 and 76. The sub-chamber 75 is defined among the diaphragm 9, the moving core 53, and the magnetic plate 52. The sub-chamber 75 is also referred to as the diaphragm chamber. In FIG. 3, the sub-chamber 76 is defined among the inner circumferential surfaces of the bobbin 5, the lower end of the stator core 6, the upper end of the moving core 53, and an upper end of the magnetic plate 52. The sub-chamber 76 accommodates the return spring 54. The sub-chamber is also referred to as the spring chamber. As best shown in FIGS. 6 and 8, a clearance 77 is provided between the outer circumferential surface of the moving core 53 and the inner circumferential surface of the magnetic plate 52 to allow axial slide of the moving core 53 relative to the magnetic plate 52. The clearance 77 connects the sub-chambers 75 and 76 with each other. The effective cross-sectional area of the clearance 77 is smaller than that of the orifice 72.

The solenoid valve 1 operates as follows. A check on the leak of fuel vapor from the pipes 104 and 105 (see FIG. 2) is started by feeding electric power to the coil 4 via the terminals 25. When the coil 4 is fed with electric power (when the coil 4 is energized), a magnetomotive force is generated so that the solenoid valve 1 moves out of its fully open state (see FIGS. 5 and 6) and the moving core 53 is attracted toward the stator core 6 against the force of the return spring 54. At this time, the projection on the moving core 53 moves into the recess in the stator core 6. Then, the solenoid valve 1 falls into its closed state (see FIGS. 7 and 8). Specifically, the shaft 7 and the valve member 8 move together with the moving core 53 in the upward direction as viewed in FIGS. 5–8. The valve member 8 contacts the valve seat 16, thereby closing the valve opening 14.

The diaphragm 9 deforms in accordance with the upward movement of the shaft 7. The upward movement of the moving core 53, the shaft 7, and the valve member 8, and the deformation of the diaphragm 9 are allowed by contraction of the diaphragm chamber 75 and the spring chamber 76 (the second control chamber 12), that is, escape of air therefrom. During the upward movement of the moving core 53 from its lowermost position as viewed in FIGS. 5–8, air escapes from the spring chamber 76 to the controlled-fluid passage 22 through the orifice 72, the passage 73, the passage 74, the hole 70, and the water repellent filter 71. The rate of escape of air from the spring chamber 76 is limited by the orifice 72. Therefore, air slowly escapes from the spring chamber 76, and the rate of a drop in the pressure within the spring chamber 76 is relatively low. As the diaphragm 9 deforms, air is driven from the diaphragm chamber 75 into the spring chamber 76 through the clearance 77. The rate of flow of air from the diaphragm chamber 75 into the spring chamber 76 is limited by the clearance 77. The effective cross-sectional area of the clearance 77 is smaller than that of the orifice 72. Therefore, air very slowly moves out of the diaphragm chamber 75. The rate of a drop in the pressure within the diaphragm chamber 75 can be lower than that of a drop in the pressure within the spring chamber 76. Thus, air escapes from the second control chamber 12 at a low rate so that the diaphragm 9 slowly deforms upward from its lowermost position as viewed in FIGS. 5–8. The connection portion (the central portion) 64 of the diaphragm 9 is less deformable than the easily deformable portion 65 thereof which extends around the connection portion 64. Accordingly, the moving core 53, the shaft 7, and the valve member 8 slowly move upward as viewed in FIGS. 5–8. As a result, the valve member 8 gently contacts the valve seat 16 (see FIGS. 7 and 8). Thus, it is possible to effectively suppress the level of noise generated when the valve member 8 meets the valve seat 16.

After the check on the leak of fuel vapor from the pipes 104 and 105 (see FIG. 2) is completed, the feed of electric power to the coil 4 is suspended. The magnetomotive force disappears upon the suspension of the electric power feed to the coil 4. Accordingly, the force of the return spring 54 moves the moving core 53, the shaft 7, and the valve member 8 downward as viewed in FIGS. 5–8. Thus, the valve member 8 separates from the valve seat 16, thereby unblocking the valve opening 14. In this way, the solenoid valve 1 is changed from its closed state to its open state.

In the case where the vehicular engine is operating and the solenoid valve 1 remains in its open state, when the purge valve 107 is opened, the canister 102 is subjected to a vacuum generated by the vehicular engine (see FIG. 2). The vacuum causes an atmosphere to be drawn into the canister 102 via the controlled-fluid passage 22, the first control chamber 11 (the hole 17), the valve opening 14, the controlled-fluid passage 21, and the pipe 109. The atmosphere is further drawn from the canister 102 into the engine air passage 103 via the pipe 15 and the purge valve 107. At this time, the atmosphere carries fuel vapor from the canister 102 to the engine air passage 103.

The diaphragm 9 deforms in accordance with the downward movement of the shaft 7. The downward movement of the moving core 53, the shaft 7, and the valve member 8, and the deformation of the diaphragm 9 are allowed by expansion of the diaphragm chamber 75 and the spring chamber 76 (the second control chamber 12), that is, introduction of air thereinto. During the downward movement of the moving core 53 from its uppermost position as viewed in FIGS. 5–8, air flows into the spring chamber 76 from the controlled-fluid passage 22 through the water repellent filter 71, the hole 70, the passage 74, the passage 73, and the orifice 72. The rate of flow of air into the spring chamber 76 is limited by the orifice 72. Therefore, air slowly enters the spring chamber 76, and the rate of a rise in the pressure within the spring chamber 76 is relatively low. As the diaphragm 9 deforms, air is drawn from the spring chamber 76 into the diaphragm chamber 75 through the clearance 77. The rate of flow of air from the spring chamber 76 into the diaphragm chamber 75 is limited by the clearance 77. The effective cross-sectional area of the clearance 77 is smaller than that of the orifice 72. Therefore, air very slowly flows into the diaphragm chamber 75. The rate of a rise in the pressure within the diaphragm chamber 75 can be lower than that of a rise in the pressure within the spring chamber 76. Thus, air flows into the second control chamber 12 at a low rate so that the diaphragm 9 slowly deforms downward from its uppermost position as viewed in FIGS. 5–8. The connection portion (the central portion) 64 of the diaphragm 9 is less deformable than the easily deformable portion 65 thereof which extends around the connection portion 64. Accordingly, the moving core 53, the shaft 7, and the projection 63 on the shaft 7 slowly move downward as viewed in FIGS. 5–8. As a result, the central projection 62 on the shaft 7 gently contacts the shaft supports 15. Thus, it is possible to effectively suppress the level of noise generated when the central projection 62 on the shaft 7 meets the shaft supports 15.

When the supply of fuel into the fuel tank 101 is required, a filler cap is removed from a filler neck on the fuel tank 101 (see FIG. 2). Therefore, air enters the fuel tank 101 via the filler neck, and then flows from the fuel tank 101 into the canister 102 via the pipe 104. Provided that the solenoid valve 1 is in its open state, the air returns from the canister 102 to an exterior through the pipe 109, the controlled-fluid passage 21, the valve opening 14, the first control chamber 11 (the hole 17), and the controlled-fluid passage 22.

The solenoid valve 1 provides advantages as follows. During the change of the solenoid valve 1 to its closed state, the valve member 8 gently contacts the valve seat 16 while the pressure balance between the first control chamber 11 and the second control chamber 12 is suitably adjusted. Therefore, it is possible to suppress the level of noise when the valve member 8 meets the valve seat 16. During the change of the solenoid valve 1 to its open state, the central projection 62 on the shaft 7 gently contacts the shaft supports 15 while the pressure balance between the first control chamber 11 and the second control chamber 12 is suitably adjusted. Therefore, it is possible to suppress the level of noise when the central projection 62 on the shaft 7 meets the shaft supports 15.

The connection portion (the central portion) 64 of the diaphragm 9 is attached to the shaft 7. The connection portion 64 of the diaphragm 9 is less deformable than the easily deformable portion 65 thereof which extends around the connection portion 64. The moving core 53 is supported by the diaphragm 9. The connection portion 64 of the diaphragm 9 prevents unwanted deformation of the diaphragm 9 while suitably maintaining the pressure balance between the first control chamber 11 and the second control chamber 12.

The diaphragm 9 airtightly or fluidtightly separates the controlled-fluid passage 10 and the second control chamber 12 from each other. Thus, the diaphragm 9 provides airtight or fluidtight separation of the electromagnetic drive unit, the magnetic plate 52, and the moving core 53 from the controlled-fluid passage 10. Accordingly, the diaphragm 9 can avoid the exposure of the electromagnetic drive unit (including the coil 4), the magnetic plate 52, and the moving core 53 to water or other foreign substances in air coming from the controlled-fluid passage 10. Therefore, it is possible to prevent the occurrence of the short circuit of the coil 4, the rust on the coil 4, and the defective slide between the magnetic plate 52 and the moving core 53 which might be caused by water or other foreign substances.

When the solenoid valve 1 is changed to its open state, the shaft supports 15 act as the stoppers 47 for the shaft 7. In addition, the shaft supports 15 can suppress unwanted tilt of the shaft 7. Accordingly, during the change of the solenoid valve 1 to its closed position, the valve member 8 contacts the valve seat 16 while being prevented from tilting. Thus, the valve opening 14 can surely be closed, and a leakage through the solenoid valve 1 can be prevented.

During assembly, the shaft 7 is easily connected with the tubular member 3. Specifically, the sectoral segments of the central projection 62 on the shaft 7 are passed through the sectoral portions of the valve opening 14, respectively (see FIG. 10). Then, the shaft 7 is rotated relative to the valve opening 14 by a predetermined angle. As a result, the central projection 62 thereon can engage the shaft supports 15 on the tubular member 3. In addition, separation of the shaft 7 from the tubular member 3 can be prevented. The shaft supports 15 and the tubular member 3 are integral with each other.

Second Embodiment

A second embodiment of this invention is similar to the first embodiment thereof except for a design change indicated below. A solenoid valve 1 in the second embodiment of this invention is used in an auxiliary apparatus or an air conditioner for a vehicle.

Third Embodiment

A third embodiment of this invention is similar to the first or second embodiment thereof except for a design change indicated below. The third embodiment of this invention uses gas, gas-phase coolant, liquid, liquid-phase coolant, or gas-liquid two-phase fluid instead of air.

Fourth Embodiment

A fourth embodiment of this invention is similar to one of the first to third embodiments thereof except for a design change indicated below. In a solenoid valve 1 of the fourth embodiment of this invention, a central projection 62 on a shaft 7 is provided with a cushion rubber ring. When the solenoid valve 1 assumes its open state, the cushion rubber ring on the central projection 62 contacts shaft supports 15.

Fifth Embodiment

A fifth embodiment of this invention is similar to one of the first to fourth embodiments thereof except for design changes indicated below. In the fifth embodiment of this invention, the shapes of a valve opening 14 and shaft supports 15 are ones of a combination of triangles, a combination of rectangles, a polygon, a combination of ellipses, and a circle.

Sixth Embodiment

A sixth embodiment of this invention is similar to one of the first to fifth embodiments thereof except for a design change indicated below. In a solenoid valve 1 of the sixth embodiment of this invention, portions of shaft supports 15 are narrower as the portions move from the bases of the shaft supports 15 toward the distal ends thereof.

Seventh Embodiment

A seventh embodiment of this invention is similar to one of the first to sixth embodiments thereof except for a design change indicated below. In a solenoid valve 1 of the seventh embodiment of this invention, shaft supports 15 are provided with reinforcing ribs.

Eighth Embodiment

An eighth embodiment of this invention is similar to one of the first to seventh embodiments thereof except for a design change indicated below. In a solenoid valve 1 of the eighth embodiment of this invention, the outside diameter of a central projection 62 on a shaft 7 is greater than the inside diameter of a valve opening 14. When the solenoid valve 1 assumes its open state, the central projection 62 on the shaft 7 contacts partition walls 13 around the valve opening 14.

Ninth Embodiment

Figure 12:
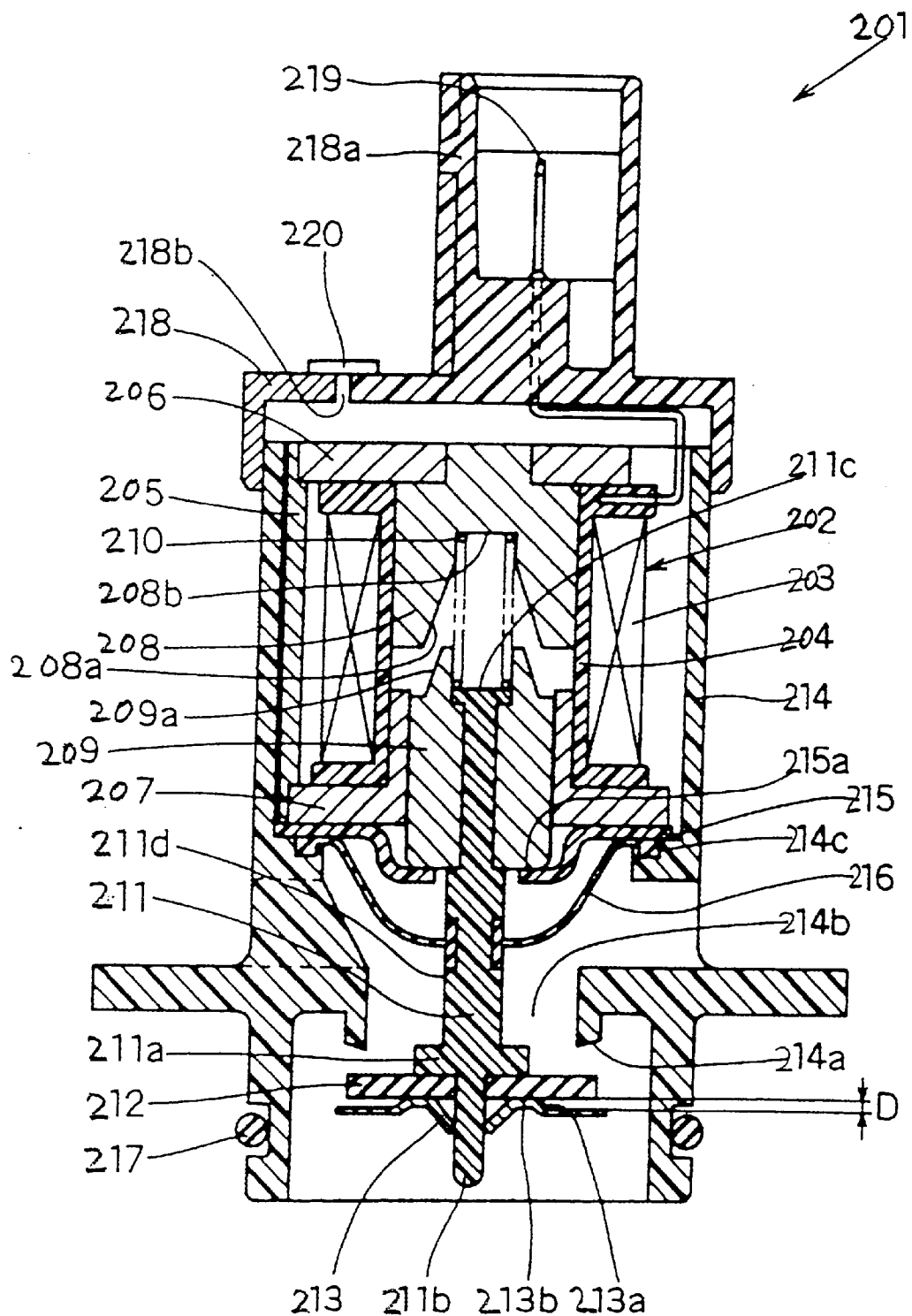
FIG. 12 is a sectional view of a solenoid valve in its open state according to a ninth embodiment of this invention.
Figure 13:
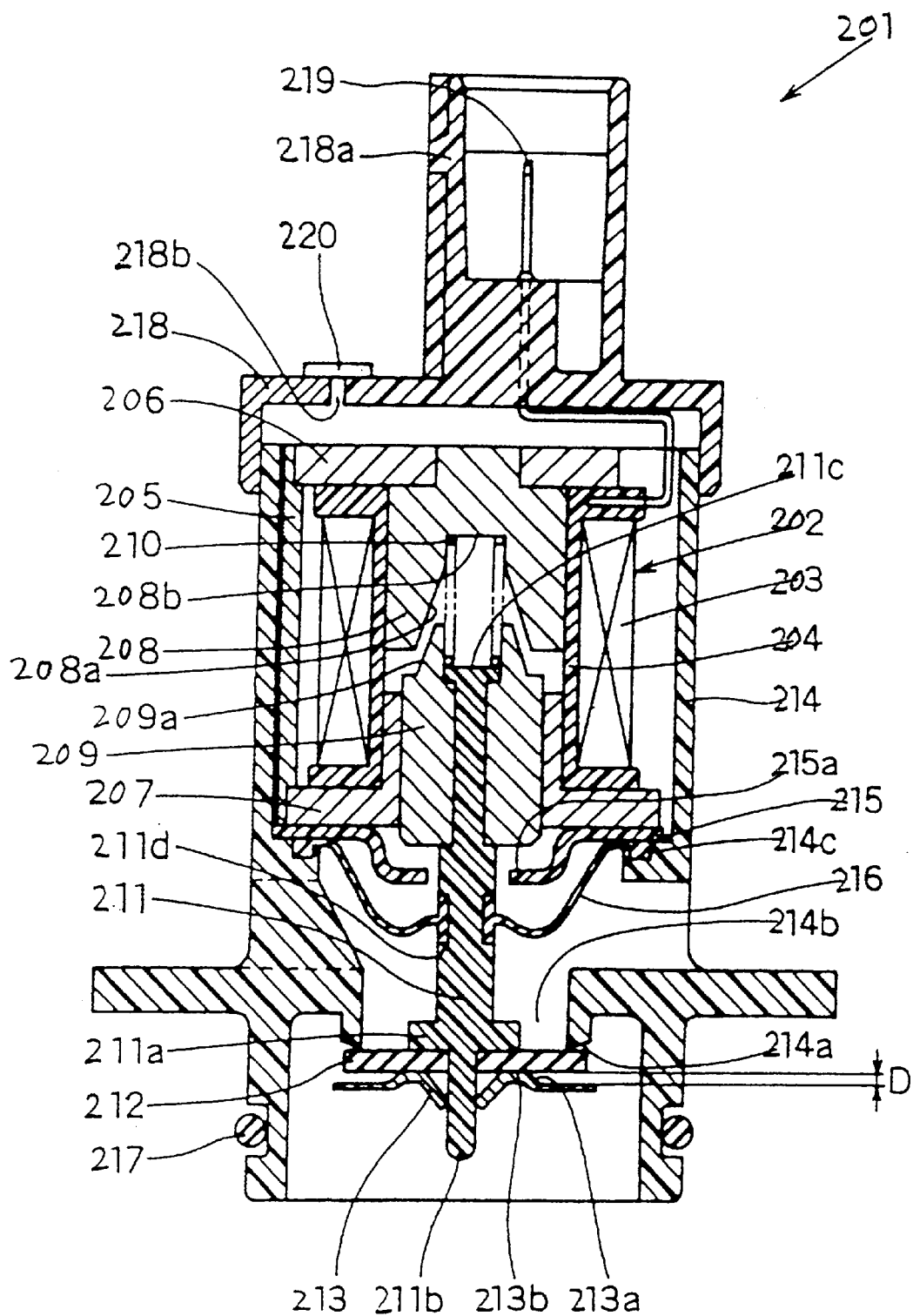
FIG. 13 is a sectional view of the solenoid valve in its closed state according to the ninth embodiment of this invention.

FIGS. 12 and 13 show a solenoid valve 201 according to a ninth embodiment of this invention. In FIG. 12, the solenoid valve 201 is in its open state. In FIG. 13, the solenoid valve 201 is in its closed state.

With reference to FIGS. 12 and 13, the solenoid valve 201 includes a tubular or cylindrical housing 214 formed with a fluid passage 214b therein. A portion of the walls of the housing 214 forms a valve seat 214a defining a part of the fluid passage 214b. The solenoid valve 201 further includes a solenoid 202, a movable shaft 211, and a movable valve member 212. The solenoid 202 is supported within the housing 214. When being energized, the solenoid 202 generates a magnetomotive force which drives the shaft 211. The valve member 212 is mounted on the shaft 211. The valve member 212 moves together with the shaft 211. The valve member 212 can contact with and separate from the valve seat 214a. When the valve member 212 contacts with the valve seat 214a, the fluid passage 214b is blocked. When the valve member 212 separates from the valve seat 214a, the fluid passage 214b is unblocked.

The housing 214 is made of suitable material such as resin or rubber. The walls of the housing 214 have a radially inward projection which extends below the solenoid 202, and which is formed with an annular groove 214c for accommodating an outer circumferential edge of a diaphragm 216. The outer circumferential surfaces of a lower end of the housing 214 have an annular groove in which an O-ring 217 fits. The lower end of the housing 214 is connected with an external pipe (not shown). The O-ring 217 provides airtight or fluidtight connection between the external pipe and the lower end of the housing 214.

An upper end of the housing 214 is closed by a cover 218 made of suitable material such as resin or rubber. The cover 218 fits on the upper end of the housing 214. The cover 218 is formed with a connector portion 218a. A pair of terminals 219 are inserted into the connector portion 218a. The terminals 219 are fixed to the connector portion 218a. The cover 218 has a through hole or a breathing hole 218b for providing communication between an exterior of the solenoid valve 201 and an interior of an upper portion of the housing 214. A filter 220 fits on the outer surfaces of the cover 218, and conceals an upper end of the breathing hole 218b. The filter 220 prevents water and dust from entering the interior of the upper portion of the housing 214 via the breathing hole 218b. The filter 220 is made of synthetic-fiber-based material having a sufficient air permeability and a high water repellency.

The solenoid 202 includes a coil 203, a yoke 205, a first magnetic plate 206, a second magnetic plate 207, a fixed iron core 208, and a movable iron core 209 which compose a magnetic circuit. The solenoid 202 also includes a bobbin 204 made of resin. The coil 203 is wound on the bobbin 204. The bobbin 204 is fixed by the yoke 205, the first magnetic plate 206, and the second magnetic plate 207. Opposite ends of the coil 203 are electrically connected to the terminals 219, respectively.

The yoke 205, the first magnetic plate 206, the second magnetic plate 207, the fixed iron core 208, and the movable iron core 209 are made of magnetic material. An upper end of the yoke 205 is magnetically coupled with the fixed iron core 208 and the first magnetic plate 206. A lower end of the yoke 205 is magnetically coupled with the second magnetic plate 207. The second magnetic plate 207 has an axially-extending central hole through which the movable iron core 209 slidably extends.

When electric power is fed to the coil 203 via the terminals 219, magnetic flux is generated in the magnetic circuit formed by the yoke 205, the first magnetic plate 206, the second magnetic plate 207, the fixed iron core 208, and the movable iron core 209. The magnetic flux causes a magnetically-induced attraction force acting between the fixed iron core 208 and the movable iron core 209. Therefore, the movable iron core 209 is moved upward (toward the fixed iron core 208). As will be made clear later, the upward movement of the movable iron core 209 is limited by the valve seat 214a on the walls of the housing 214. On the other hand, downward movement of the movable iron core 209 is limited by a stopper 215 indicated later.

An end (a lower end) of the fixed iron core 208 which axially faces the movable iron core 209 has a tapered recess 208a of an inverted V shape cross-section. The fixed iron core 208 has an engagement portion 208b at a deepest part of the recess 208a. The engagement portion 208b accommodates and holds an upper end of a spring 210 which will be indicated later.

The movable iron core 209 coaxially extends below the fixed iron core 208. The movable iron core 209 coaxially faces the fixed iron core 208. The movable iron core 209 has an axially-extending central hole into which the shaft 211 extends. The shaft 211 is fixed to the movable iron core 209. The shaft 211 is made of nonmagnetic material. An end (an upper end) of the movable iron core 209 which faces the fixed iron core 208 has a tapered projection 209a basically conforming to the recess 208a in the fixed iron core 208.

The spring 210 is provided between the fixed iron core 208 and the movable iron core 209. An upper end of the spring 210 abuts against the engagement portion 208b of the stator iron core 208. A lower end of the spring 210 abuts against a flange 211c formed on an exposed upper end of the shaft 211. The spring 210 urges the shaft 211 and the movable iron core 209 in a direction away from the fixed iron core 208.

As previously mentioned, the shaft 211 is fixed to the movable iron core 209. Therefore, the shaft 211 moves upward and downward together with the movable iron core 209. A lower portion of the shaft 211 has a flange 211a, and an axial projection 211b extending coaxially and downward from the flange 211a. The valve member 212 has a central aperture through which the projection 211b of the shaft 211 extends. A fixing member 213 mounted on the projection 211b presses the valve member 212 against the flange 211a, thereby securing the valve member 212 to the shaft 211.

During assembly, the valve member 212 is placed around the projection 211b of the shaft 211. Then, the fixing member 213 is fitted on the projection 211b by a pressing process. The fixing member 213 is adjusted so as to press the valve member 212 against the flange 211a on the shaft 211.

The outer circumferential surface of a portion of the shaft 211 between the movable iron core 209 and the flange 211a has an annular groove 211d into which an inner circumferential edge of the diaphragm 216 fits.

The stopper 215 is made of non-magnetic material. The stopper 215 has a central aperture through which the shaft 211 extends. The stopper 215 separates radially outward from the shaft 211. An outer portion of the stopper 215 is held among the yoke 205, the second magnetic plate 207, and a step on the walls of the housing 214. An inner portion of the stopper 215 forms an engagement portion 215a which the lower end of the movable iron core 209 can meet. The engagement portion 215a limits movement of the movable iron core 209 away from the fixed iron core 208. As previously mentioned, the outer circumferential edge of the diaphragm 216 fits into the groove 214c in the walls of the housing 214. The groove 214c extends at the step on the walls of the housing 214. The outer circumferential edge of the diaphragm 216 is held between the stopper 215 and the step on the walls of the housing 214.

As previously mentioned, the inner circumferential edge of the diaphragm 216 fits into the annular groove 211d of the shaft 211. Thus, the inner circumferential edge of the diaphragm 216 is supported by the shaft 211. As previously mentioned, the outer circumferential edge of the diaphragm 216 is held between the stopper 215 and the step on the walls of the housing 214. The diaphragm 216 provides airtight or fluidtight separation between the fluid passage 214b in the housing 214 and a portion of the interior of the housing 214 which contains the solenoid 202. The diaphragm 216 is made of flexible and easily-deformable material such as rubber. The diaphragm 216 allows movement of the shaft 211 (that is, movement of the movable iron core 209).

The valve member 212 is made of, for example, rubber. The valve member 212 is of, for example, a disk shape. The valve member 212 has the central aperture for accommodating the shaft 211.

The fixing member 213 includes a snap washer of a ring shape or a disk shape. The fixing member 213 has an outside diameter approximately equal to that of the valve member 212. The fixing member 213 is formed with an annular projection 213b extending axially toward the valve member 212 and having flat top surfaces. The flat top surfaces of the projection 213b of the fixing member 213 abut against the valve member 212. The projection 213b of the fixing member 213 forms an engagement portion for supporting the valve member 212. A portion of the fixing member 213 which extends outward of the engagement portion 213b is thinner than the rest of the fixing member 213. The outer side surfaces of the engagement portion (the projection) 213b provide a step 213a by which the outer portion of the fixing member 213 is spaced from a corresponding outer portion of the valve member 212. Thus, a gap D of a predetermined dimension (a predetermined thickness) extends between the outer portion of the valve member 212 and the outer portion of the fixing member 213.

The solenoid valve 201 is assembled as follows. The solenoid 202 except the movable iron core 209 is pre-assembled by suitable steps. The leads of the coil 203 are electrically connected to the terminals 219 on the cover 218 by a fusing process. Subsequently, the spring 210 and the movable iron core 209 are inserted into the solenoid 202. At this time, one end of the spring 210 is brought into contact with the engagement portion 208b of the fixed iron core 208. The other end of the spring 210 is brought into contact with the flange 211c of the shaft 211. It should be noted that the shaft 211 is previously attached to the movable iron core 209. The outer circumferential edge of the diaphragm 216 is fitted into the annular groove 214c in the walls of the housing 214. Thereafter, the stopper 215 is placed in the housing 214. Subsequently, the solenoid 202 which holds the movable iron core 209 and the spring 210 is inserted into the housing 214 from above as viewed in FIGS. 12 and 13.

At this time, the lower end surface of the movable iron core 209 is brought into contact with the stopper 215, and the inner circumferential edge of the diaphragm 216 is fitted into the groove 211d in the shaft 211. The cover 218 and the housing 214 are fixed to each other by, for example, a thermally welding process. The valve member 212 is placed on the projection 211b of the shaft 211. The valve member 212 is brought into contact with the flange 211a of the shaft 211. Then, the fixing member 213 is placed on the projection 211b of the shaft 211. The fixing member 213 is set so as to press the valve member 212 against the flange 211a of the shaft 211. At this time, the engagement portion 213b of the fixing member 213 abuts against the valve member 212. In this way, assembling the solenoid valve 201 is completed.

The solenoid valve 201 operates as follows. When power feed to the coil 203 is absent as shown in FIG. 12, the spring 210 holds the movable iron core 209 in contact with the stopper 215. At this time, the valve member 212 is separate from the valve seat 214a so that the fluid passage 214b is unblocked.

When electric power is fed to the coil 203, magnetic flux is generated by the coil 203. The magnetic flux flows in a closed magnetic circuit composed of the yoke 205, the first magnetic plate 206, the movable iron core 209, the fixed iron core 208, and the second magnetic plate 207. Therefore, the movable iron core 209 and the shaft 211 are moved toward the fixed iron core 208 against the force of the spring 210. As a result, the valve member 212 comes into contact with the valve seat 214a, and hence the fluid passage 214b is blocked (see FIG. 13). As the valve member 212 is pressed against the valve seat 214a, an outer portion of the valve member 212 deforms downward in FIG. 13. The gap D between the outer portion of the valve member 212 and the outer portion of the fixing member 213 which occurs under normal conditions allows the downward deformation of the valve member 212. The outer portion of the valve member 212 reaches the outer portion of the fixing member 213, and then further deforms downward together with the outer portion of the fixing member 213. The thinness of the outer portion of the fixing member 213 allows the downward deformation of the valve member 212 and the fixing member 213. The downward deformation of the valve member 212 absorbs a shock thereon which occurs when the valve member 212 meets the valve seat 214a. Thus, it is possible to reduce the level of noise generated when the valve member 212 meets the valve seat 214a.

The solenoid valve 201 provides advantages as follows. The outer side surfaces of the engagement portion (the projection) 213b provide the step 213a by which the outer portion of the fixing member 213 is spaced from the outer portion of the valve member 212. Thus, the gap D extends between the outer portion of the valve member 212 and the outer portion of the fixing member 213. The outer portion of the fixing member 213 is thinner than the rest of the fixing member 213. Therefore, as previously mentioned, it is possible to reduce the level of noise generated when the valve member 212 meets the valve seat 214a.

The valve member 212 can deform to a large extend when meeting the valve seat 214a. Thus, even in the case where the valve member 212 tilts relative to the shaft 211 or the shaft 211 tilts, the valve member 212 deforms in accordance with the shape of the valve seat 214a and comes into contact with a complete circle of the valve seat 214a upon the change of the solenoid valve 201 to its closed state. Accordingly, reliable airtight contact or reliable fluidtight contact between the valve member 212 and the valve seat 214a is provided when the solenoid valve 201 assumes its closed state.

The valve member 212 is attached to the shaft 211 only by the fixing member 213. Therefore, the solenoid valve 201 is composed of a small number of parts.

Tenth Embodiment

Figure 14:
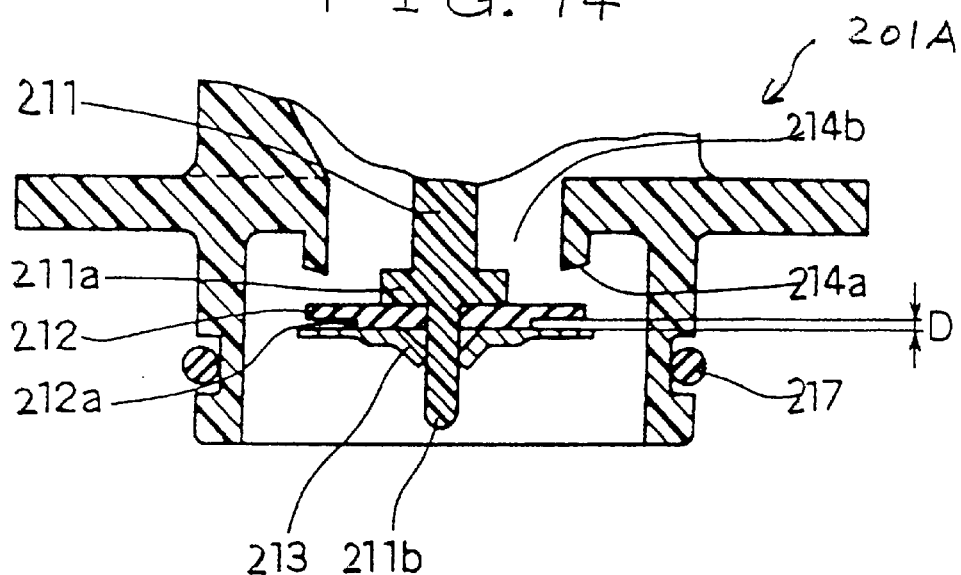
FIG. 14 is a sectional view of a portion of a solenoid valve according to a tenth embodiment of this invention.

FIG. 14 shows a portion of a solenoid valve 201A according to a tenth embodiment of this invention. The solenoid valve 201A of FIG. 14 is similar to the solenoid valve 201 of FIGS. 12 and 13 except for design changes indicated below.

In the solenoid valve 201A of FIG. 14, a fixing member 213 except its innermost portion has a flat surface opposing a valve member 212. An outer portion of the fixing member 213 is thinner than the rest of the fixing member 213. A surface of the valve member 212 which opposes the fixing member 213 has a step 212a by which an outer portion of the valve member 212 is spaced from a corresponding outer portion of the fixing member 213. Thus, a gap D of a predetermined dimension (a predetermined thickness) extends between the outer portion of the valve member 212 and the outer portion of the fixing member 213.

The solenoid valve 201A of FIG. 14 provides advantages similar to those given by the solenoid valve 201 of FIGS. 12 and 13.

It should be noted that the whole of the fixing member 213 may be uniform in thickness.

Eleventh Embodiment

Figure 15:
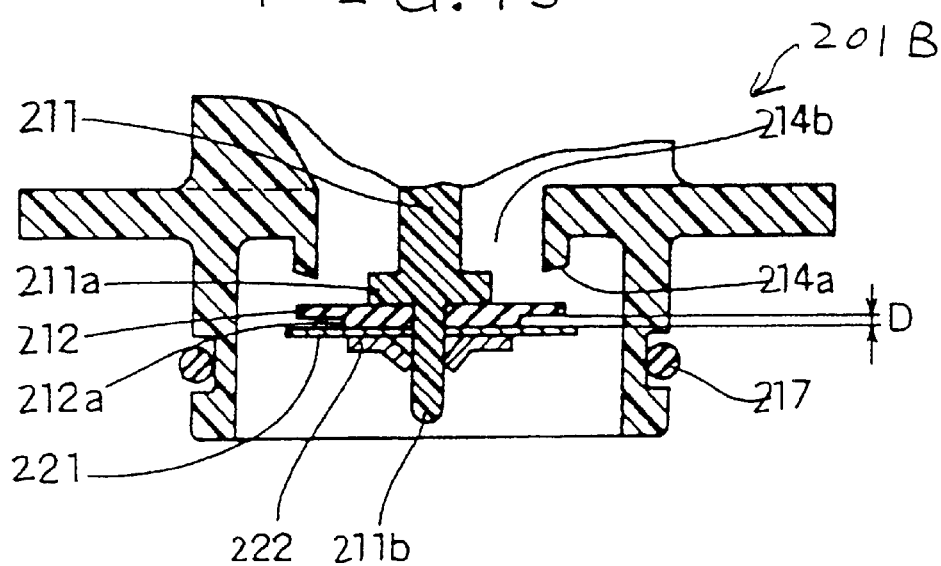
FIG. 15 is a sectional view of a portion of a solenoid valve according to an eleventh embodiment of this invention.

FIG. 15 shows a portion of a solenoid valve 201B according to an eleventh embodiment of this invention. The solenoid valve 201B of FIG. 15 is similar to the solenoid valve 201 of FIGS. 12 and 13 except for design changes indicated below.

In the solenoid valve 201B of FIG. 15, a thin plate 221 and a snap washer 222 fit on a projection 211b of a shaft 211. The thin plate 221 extends between the snap washer 222 and a valve member 212. The thin plate 221 is made of metal or resin. The thin plate 221 is resilient. The snap washer 222 presses the thin plate 221 against the valve member 212, thereby thrusting the valve member 212 against a flange 211a on the shaft 211.

A surface of the valve member 212 which opposes the thin plate 221 has a step 212a by which an outer portion of the valve member 212 is spaced from a corresponding outer portion of the thin plate 221. Thus, a gap D of a predetermined dimension (a predetermined thickness) extends between the outer portion of the valve member 212 and the outer portion of the thin plate 221. The snap washer 222 has an outside diameter approximately equal to or slightly smaller than that defined by the step 212a on the valve member 212. Preferably, the snap washer 222 extends inward of an area defined by the step 212a.

Upon the change of the solenoid valve 201B to its closed state, the valve member 212 meets a valve seat 214a. As the valve member 212 is pressed against the valve seat 214a, an outer portion of the valve member 212 deforms downward in FIG. 15. The gap D between the outer portion of the valve member 212 and the outer portion of the thin plate 221 which occurs under normal conditions allows the downward deformation of the valve member 212. The outer portion of the valve member 212 reaches the outer portion of the thin plate 221, and then further deforms downward together with the outer portion of the thin plate 221. The resiliency of the thin plate 2221 allows the downward deformation of the valve member 212 and the thin plate 221. The downward deformation of the valve member 212 absorbs a shock thereon which occurs when the valve member 212 meets the valve seat 214a. Thus, it is possible to reduce the level of noise generated when the valve member 212 meets the valve seat 214a.

In addition, reliable airtight contact or reliable fluidtight contact between the valve member 212 and the valve seat 214a is provided when the solenoid valve 201B assumes its closed state.

It should be noted that the step 212a may be omitted from the valve member 212. In this case, the whole of the lower surface of the valve member 212 contacts the thin plate 221.

What is claimed is:

1. A solenoid valve comprising:

(a) an electromagnetic drive unit for generating a magnetomotive force when being fed with electric power;

(b) a member having a controlled-fluid passage and an accommodation chamber containing the electromagnetic drive unit;

(c) a partition wall defining a part of the controlled-fluid passage;

(d) a valve opening extending through the partition wall;

(e) a shaft extending through the valve opening and being driven by the electromagnetic drive unit;

(f) a valve member fixed to the shaft and moving into and out of contact with the partition wall to block and unblock the valve opening in accordance with movement of the shaft; and (g) a thin-film sealing member connected to the shaft for motion in response to the movement of the shaft and made of rubber-based resilient material for airtightly separating the controlled-fluid passage and the accommodation chamber from each other, the thin-film sealing member having a first portion, a second portion and a third portion, the second portion extending around the first portion and the first portion extending around the third portion which is engaged with and contacts the shaft, the first portion being less resiliently deformable than the second portion, the first portion being coupled to the shaft via the third portion for motion in response to the movement of the shaft, and the second portion deforming in response to the motion of the first portion.

2. A solenoid valve as recited in claim 1, wherein the first portion is thicker than the second portion.

3. A solenoid valve as recited in claim 2, wherein the first portion extends over a central area of the thin-film sealing member between the third portion and the first portion.

4. A solenoid valve as recited in claim 1, wherein the partition wall forms a valve seat with which the valve member is moved into and out of contact.

5. A solenoid valve as recited in claim 1, wherein the partition wall has a projection forming a shaft support for locating the shaft radially while allowing axial movement of the shaft.

6. A solenoid valve as recited in claim 5, wherein the projection of the partition wall forms a stopper engageable with a projection on the shaft.

7. A solenoid valve as recited in claim 5, wherein the projection on the shaft has a cross section of a shape corresponding to an inner shape of the shaft support.

8. A solenoid valve comprising:

a housing defining a fluid passage;

a valve seat defining a part of the fluid passage;

a valve member movable into and out of contact with the valve seat to block and unblock the fluid passage;

a shaft;

a fixing member for fixing the valve member to the shaft;

a movable iron core holding the shaft and forming a first part of a magnetic circuit;

a fixed iron core facing the movable iron core and forming a second part of the magnetic circuit; and a coil extending around the movable iron core and the fixed iron core and generating a magnetic force to move the movable iron core toward the fixed iron core when being fed with electric power;

wherein an outer portion of the fixing member is spaced from a corresponding portion of the valve member by a gap for allowing deformation of the valve member and an inner portion of the fixing member forms an annular projection extending axially toward the valve member.

9. A solenoid valve as recited in claim 8, wherein the fixing member has a first portion and a second portion, the first portion extending around the second portion and being thinner than the second portion.

10. A solenoid valve as recited in claim 8, wherein the gap is provided by a step on at least one of the fixing member and the valve member.

11. A solenoid valve as recited in claim 8, wherein the annular projection includes a flat top surface which abuts against the valve member.

* * * * *